Dec. 2, 1930. H. D. MATTHEWS 1,783,179
THERMOSTATIC SWITCH
Filed Sept. 23, 1927  3 Sheets-Sheet 1

INVENTOR
Howard D. Matthews
BY
Chesley L. Carr
ATTORNEY

Dec. 2, 1930  H. D. MATTHEWS  1,783,179
THERMOSTATIC SWITCH
Filed Sept. 23, 1927   3 Sheets-Sheet 2

INVENTOR
Howard D. Matthews
BY
Wesley G. Carr
ATTORNEY

Dec. 2, 1930.  H. D. MATTHEWS  1,783,179
THERMOSTATIC SWITCH
Filed Sept. 23, 1927   3 Sheets-Sheet 3

INVENTOR
Howard D. Matthews
BY
Wesley G. Carr
ATTORNEY

Patented Dec. 2, 1930

1,783,179

UNITED STATES PATENT OFFICE

HOWARD D. MATTHEWS, OF MANSFIELD, OHIO, ASSIGNOR TO WESTINGHOUSE ELECTRIC & MANUFACTURING COMPANY, A CORPORATION OF PENNSYLVANIA

THERMOSTATIC SWITCH

Application filed September 23, 1927. Serial No. 221,413.

My invention relates to thermostatic devices and particularly to devices for controlling the temperature of refrigerators and similar apparatus.

An object of my invention is to provide a thermostatic device that shall be simple in construction and easily manufactured.

Another object of my invention is to provide a snap-acting thermostatic device having a large inherent temperature differential between its upper and lower operating temperatures, with means for regulating the frequency of operation thereof in order that the temperature of a body to be controlled thereby may be varied over a temperature range substantially equal to, or greater than, the range defined by the upper and lower temperatures of the thermostatic device.

And a still further object of my invention is to provide a thermostatic device, totally enclosed and shielded from atmospheric conditions, with means whereby the device may be adjusted to control the temperature of a body over a relatively wide range of temperatures without causing the thermostatic device to be disassembled.

For a fuller understanding of my invention, reference may be had to the following description taken in conjunction with the accompanying drawings in which Figure 1 is a view, partially in vertical section, of a thermostatic device embodying my invention;

Figure 1:
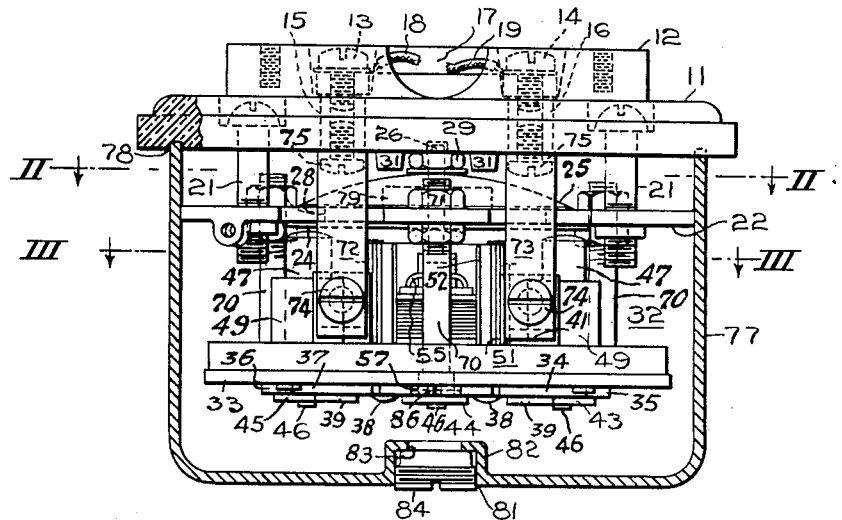

In the drawings, a thermostatic device for controlling the temperature of such apparatus as electric refrigerators is shown, the application of which is shown more particularly in detail in a copending application, Serial No. 101,313, filed April 12, 1926.

In the drawings, a terminal-supporting plate 11 is illustrated that is provided with a raised boss portion 12 having recesses therein for protecting terminal screws 13 and 14 that have screw-threaded engagement with interiorly screw-threaded bushings 15 and 16, respectively. The bushings 15 and 16 may be molded in the supporting plate 11 which may be of material possessing electrical insulating properties and adapted to be molded.

The boss 12 of the plate 11 may be provided with a semi-circular depression 17 through which conductors 18 and 19 may be inserted to make electrical connection with the terminals 13 and 14.

The plate 11 is provided with openings through which a plurality of bolts 21 may extend for supporting a metallic plate 22, the bolts having screw-thread engagement therewith.

The plate 22 is utilized for supporting a snap-acting thermostatic disc 24 by means of a spring member 25 of disc-shape located on the upper side of the plate 22, and a bolt 26 extending through the spring and thermostatic members. In order that the central portion of the disc 24 may be adjusted, the plate 22 is provided with a circular opening 28 through which the bolt 26 projects. The initial stress to which the disc may be subjected may be adjusted by means of the spring 25, the bolt 26 and a nut 29 cooperating with the bolt.

The disc 24 may be adjusted to the proper initial stress before the plate is secured to the base 11 by the bolts 21. When properly adjusted, the bolts 21 may be drawn up tightly until the end of the bolt 26 presses against the bottom face of the plate 11.

In order that the bolt 26 may be centrally located with respect to the opening 28, the supporting plate 11 is provided with lugs 31 between which the nut 29 is located.

The thermostatic member 24 may be a bimetallic disc having a non-developable curved surface therein of the type disclosed in the patent to J. A. Spencer, No. 1,448,240.

The characteristic of this disc is such that, when heated to a temperature of a predetermined value, the curvature thereof changes abruptly from an initial curvature to a reverse curvature, and, when cooled to a lower temperature, it assumes its initial shape with a sudden snap motion.

Ordinarily, the difference between these two temperatures is relatively large and may be varied between certain limits, depending upon, the metals or alloys constituting the bimetallic disc, and the process used in its manufacture.

In order that reversals in shape of the disc may be utilized for controlling an electric circuit, a switch mechanism 32 is provided. The switch mechanism comprises a base 33, which may be molded from electric insulating material, and a plurality of spaced contact members 34, 35, 36 and 37 secured to the bottom of the base. The contacts 35 and 36 may be secured to the base by rivets 38 or other suitable means, and the contacts 34 and 37 may be secured thereto by rivets 39 that extend through the base. The rivets 39 serve also to support a plurality of terminals 41 and 42, for the contacts 34 and 37 on the upper side of the base 33 (see Figs. 2 and 3).

In order that adjacent ends of the contacts 34 to 37, inclusive, may be electrically connected, and so that an electric circuit may be controlled by the terminals 41 and 42, a plurality of contact-bridging buttons 43, 44 and 45 are provided. The buttons 43 to 45, inclusive, are secured to push rods 46 that extend through the base 33. The upper ends of the push rods are provided with heads or knobs 47 of insulating material that may be molded on the push rods.

In order that the contact buttons may be held in engagement with their cooperating stationary contacts, coil springs 48 are disposed between the base and the under side of the knobs 47. The push rods may be guided over the length of their travel by cylindrical bosses 49 which may be molded integrally with the base. The inside diameter of the bosses may be slightly larger than the outside diameter of the knobs 47 in order that they may slide freely therein.

Figure 2:
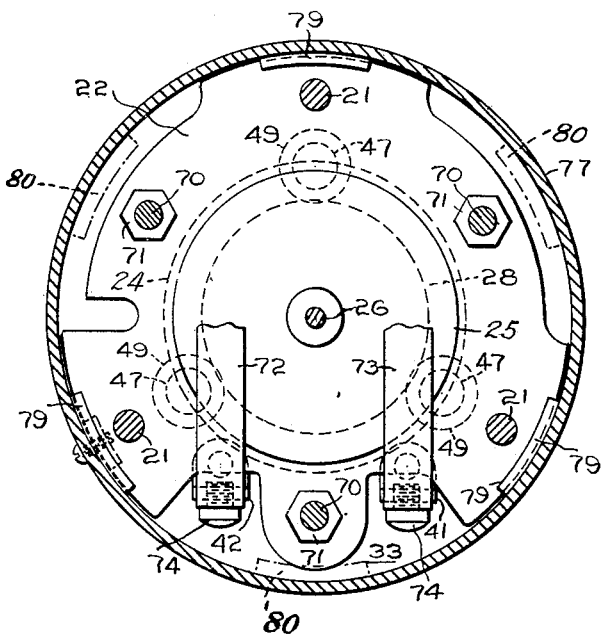
Fig. 2 is a view in section taken on the line II—II of the same device.
Figure 3:
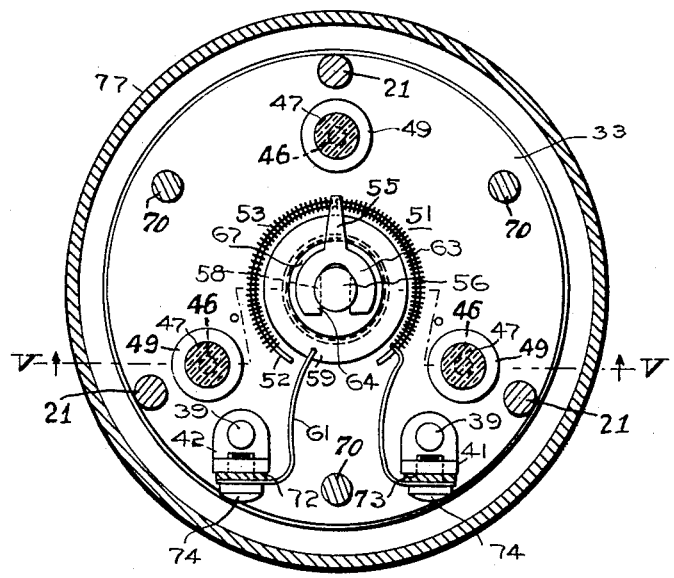
Fig. 3 is a view, in section, taken on the line III—III of Fig. 1.
Figure 4:
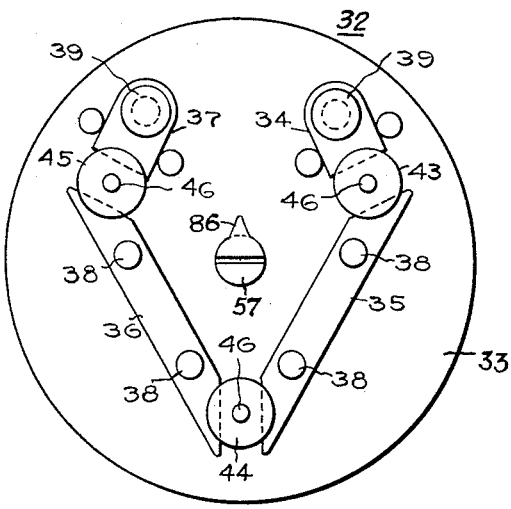
Fig. 4 is a bottom plan view of the device shown in Fig. 3, as it would appear if removed from its casing.
Figure 5:
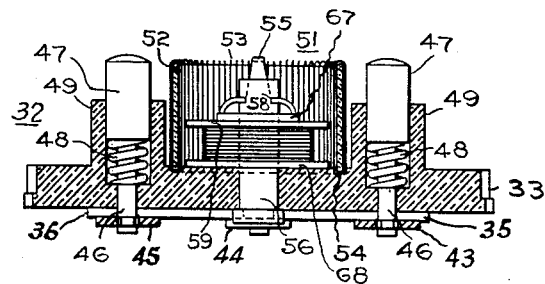
Fig. 5 is a view, in vertical section, of the device illustrated in Fig. 3, taken on the line V—V thereof.

As may be seen from Figs. 1 and 2, the knobs 47 are located along the periphery of the disc 24 and in close proximity thereto. The disc is so disposed, with respect to the high and low-expansion metals constituting the bimetallic disc, that, when the temperature thereof cools to a predetermined value, the disc snaps abruptly to engage the knobs 47 with an impact to thereby cause the contact-bridging buttons 43 to 45 inclusive, to become disengaged from their cooperating stationary contacts 34 to 37, inclusive. As the temperature increases to a predetermined value, the disc is caused to assume the position shown in Fig. 1 of the drawings, thereby permitting the springs 48 to actuate the contact bridging buttons into engagement with the stationary contact members. If the thermostatic device shown in the drawings is used for controlling the temperature of a refrigerator, the disc being permitted to operate between its normal operating temperatures responsive only to ambient temperature of the refrigerator, the temperature of the refrigerator will fluctuate over a range equal substantially to the temperature differential of the disc. When so operating, the disc will effect operation of the switch contacts at relatively widely separated intervals, because temperature changes within a refrigerator take place quite slowly.

In order that the disc may be caused to operate with greater frequency, so that the apparatus producing refrigeration may be operated at such intervals that the temperature of the refrigerator will vary between relatively close limits, the result being that the refrigerator will be maintained at a substantially constant temperature, a heating unit 51 is provided for heating the disc each time the contacts 43 to 45, inclusive, have been actuated to the open-circuit position. The heating unit comprises a strip of insulating material 52 and a plurality of turns of resistance wire 53 wound thereon. The heating unit 51 may be bent in the shape of a partial circle and placed edgewise in an annular recess 54. The heating unit may then be secured in place by a sealing compound of suitable material or by other means.

One end of the resistor element 53 may be secured to the terminal 41, but, in order that the amount of the resistor 53 to be connected between the terminals 41 and 42 may be varied, a movable contact arm 55 is provided. The movable contact arm is pivotally mounted on the base 33 by means of a rod 56 of insulating material. One end of the rod is provided with slots 58. A metal contact plate 59 is provided with a flexible lead 61 for connecting it to the terminal 42 and is located on the rod 56 intermediate its ends.

Electrical connection may be made between the movable contact arm 55 and the contact plate 59 by providing the contact arm with a resilient portion 63 having a slot 64 therein. The edges of the portion 63 may be bent downwardly so that, when the slot 64 registers with the slots 58 in the upper end of the rod 56, the contact arm 55 yieldingly presses against a washer 67 located on the metallic plate 59.

In the event that there be insufficient space on the strip 52 to receive all of the resistance wire 53 necessary for the proper operation of the thermostatic device, an additional amount of resistance conductor may be wound about the rod 56, between the plate 59 and a plate 68 located on the base 33.

The switch base 33 may be secured to the metal plate by means of the bolts 70 and cooperating nuts 71 located one on each side of the plate.

In order that the terminals 41 and 42 may be connected to the bushings 15 and 16 of the supporting plate 11, conductors 72 and 73 are provided that are secured to the terminals 41 and 42 and the bushings 15 and 16 by bolts 74 and 75, respectively.

In order that the switch mechanism 32, the plate 22 and the thermostatic disc 24 may be totally enclosed and safeguarded from atmospheric conditions common to refrigerators, a casing 77 is provided, the open end of which registers with an annular groove 78 in the base 11. The casing 77 may be supported by the plate 22 by means of lugs 79 that rest on the top edge of the plate. In order that the lugs 79 may be placed on the top face of the plate, the casing is turned until the lugs register with recesses 80 in the plate as indicated by the broken lines (see Fig. 2). In this position, the lower edge of the lugs will be in line with the upper face of the plate 22 and the casing may be turned until the lugs are in the position shown in full lines in Fig. 2.

Since it is desirable to maintain the thermostatic device entirely enclosed when it is placed in a refrigerator or other device to be controlled, the resistor heating unit 51 may be adjusted without removing the casing 77, by providing the bottom of the casing with an opening 81 and an internally screw-threaded boss 82, having an opening 83 therein in alignment with the opening 81. The boss 82 may then be provided with a stud 84 for closing the opening 83 when the thermostatic device has been properly adjusted, the thermostat being adjusted by varying the amount of resistance included in the circuit between the terminal screws 13 and 14 located at the top of the supporting plate 11.

Figure 6:
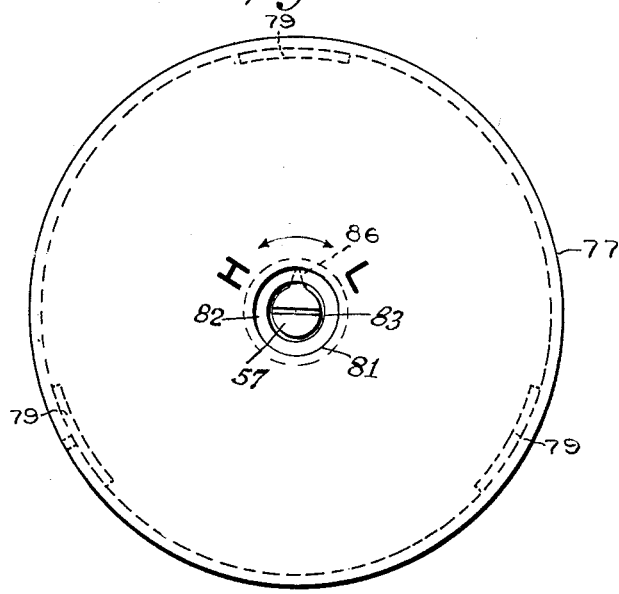
Fig. 6 is a bottom plan view of the device shown in Fig. 3.

The bottom of the casing, as shown in Fig. 6, may be provided with indicating letters H and L, and the head 57 of the rod 56 may be provided with an arrowhead 86 in order to indicate the direction in which to turn the rod 56 in order to adjust the thermostat. For example, if it is desirable to operate a refrigerator at a relatively high temperature, the rod 56 is turned, by means of a screw driver, or other suitable device, inserted through the opening 83, in such direction that the arrow 86 is turned towards the letter H, if at a lower temperature, the rod is turned so that the arrow is moved toward the letter L. When the thermostat has been adjusted to operate properly, the stud 84 may be placed in the position shown in the drawings and, in this position, the thermostatic device is totally enclosed and shielded from atmospheric conditions.

Figure 7:
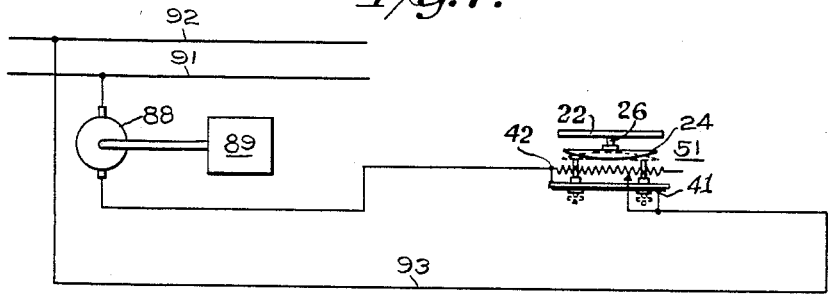
Fig. 7 is a diagrammatic view of circuits and apparatus embodying my invention.

In Fig. 7 of the drawings, the thermostatic device is illustrated as controlling the frequency of operation of a motor 88 for driving a refrigerator compressor 89. As shown, one terminal of the motor is connected to a supply conductor 91, while the other terminal of the motor is connected to the terminal 42 of the thermostatic device shown in Figs. 1 to 6, and the terminal 41 of the switch is connected to a supply conductor 92 by a conductor 93.

As shown, the resistance wire of the heating unit 51 is connected in shunt with the terminals 41 and 42. Therefore, when the contact-bridging buttons 43 to 45, inclusive, are in engagement with the stationary contact members 34 to 37, inclusive, only a small amount of current traverses the resistor 53, for the difference in potential between the terminals 41 and 42 is substantially zero.

When the switch contacts are in this position, the motor 88 is caused to operate until the temperature in the refrigerator has reached a predetermined value. At this temperature, the thermostatic disc 24 is caused to open the circuit through the switch contacts 34 to 37, inclusive, and the cooperating bridging contact members 43 to 45, inclusive.

When this circuit is open, the resistor 53 is connected in series with the motor 88 across the supply conductors 91 and 92. The resistance of the resistor 53 is preferably of such value that only a small amount of current traverses the motor and the resistor element, which amount of current is too small to cause the motor to turn and to drive the compressor 89. However, the current traversing the resistor 53 is sufficient to cause the disc 24 to be heated to the temperature at which it returns to the position shown in Fig. 1 of the drawings, in which position the fixed contacts are closed and the circuit through the motor 88 is re-established to again drive the compressor 89.

The greater the amount of heat generated by the resistor 53, the more frequent will be the operation of the thermostatic disc 24 and the more frequent will be the operation of the motor 88 and the compressor 89. If the amount of heat generated in the element 53 is decreased, the less frequent will be the operation of the disc 24 and, consequently, the motor 88 will be energized less frequently; therefore, the refrigerator will be operated at a higher temperature.

Various modifications may be made in the device embodying my invention without departing from the spirit and scope thereof. I desire, therefore, that only such limitations shall be placed thereon as are imposed by the prior art and the appended claims.

I claim as my invention:

1. A thermally actuable switch including a casing, a combined terminal-supporting and cover member for the casing, a plate in the casing supported from the cover member, a contact table supported from the plate, a bimetallic element supported from the plate, on that side thereof adjacent to the contact table, and an adjustable heating element mounted on said contact table at that side thereof adjacent to the plate.

2. A thermally actuable switch including an open-end casing having a relatively small opening in the wall opposed to said open end, a cover member for the open end of the casing, an intermediate plate and a base plate supported in said casing from said cover member, a bimetallic disc supported from the intermediate plate on that side thereof adjacent the base plate, contact members on said base plate adapted to be actuated by the bimetallic disc, a resistor heating element located against that face of the base plate adjacent to the intermediate plate, and means projecting through the base plate and engageable through the small opening in the casing for adjusting the amount of resistance connected in circuit.

3. A thermally actuable switch including an open-end casing having a relatively small opening in the wall opposed to said open end, a cover member for the open end of the casing, an intermediate plate and a base plate supported in said casing from said cover member, a bimetallic disc supported from the intermediate plate on that side thereof adjacent the base plate, contact members on said base plate adapted to be actuated by the bimetallic disc, a resistor heating element of arcuate form located against that face of the base plate adjacent to the intermediate plate, a resilient contact arm operatively engaging the resistor, and a rod extending through the base plate and having the contact arm mounted thereon at one end thereof, the other end of the rod being axially alined with the small opening in the casing and engageable by means inserted through the small opening to adjust the amount of effective resistance in circuit.

In testimony whereof, I have hereunto subscribed my name this 3rd day of Sept. 1927.

HOWARD D. MATTHEWS.